United States Patent
Chirita et al.

(10) Patent No.: US 11,508,496 B2
(45) Date of Patent: Nov. 22, 2022

(54) OPTO-ELECTRIC CABLE

(71) Applicant: PRYSMIAN S.p.A., Milan (IT)

(72) Inventors: Florin Chirita, Slatina (RO); Vili Popescu, Slatina (RO); Cristian Gheorghe, Slatina (RO); Baris Sönmez, Bursa (TR)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 17/111,333

(22) Filed: Dec. 3, 2020

(65) Prior Publication Data
US 2021/0174988 A1 Jun. 10, 2021

(30) Foreign Application Priority Data
Dec. 4, 2019 (IT) .................. 102019000022977

(51) Int. Cl.
*H01B 9/00* (2006.01)
*G02B 6/44* (2006.01)
*H01B 3/44* (2006.01)

(52) U.S. Cl.
CPC ........... *H01B 9/005* (2013.01); *G02B 6/4494* (2013.01); *H01B 3/44* (2013.01)

(58) Field of Classification Search
CPC ......... H01B 9/005; H01B 3/44; G02B 6/4494
See application file for complete search history.

(56) References Cited

U.S. PATENT DOCUMENTS

| | | | | |
|---|---|---|---|---|
| 1,540,249 A | * | 6/1925 | Brown | H01R 4/66 174/6 |
| 4,078,853 A | * | 3/1978 | Kempf | G02B 6/4411 385/114 |
| 4,375,313 A | * | 3/1983 | Anderson | G02B 6/4413 174/109 |
| 4,557,560 A | * | 12/1985 | Bohannon, Jr. | G02B 6/448 385/113 |
| 5,029,974 A | * | 7/1991 | Nilsson | G02B 6/443 385/113 |
| 5,195,158 A | * | 3/1993 | Bottoms, Jr. | G02B 6/4407 385/105 |
| 5,309,539 A | * | 5/1994 | Sano | G02B 6/4436 385/106 |

(Continued)

FOREIGN PATENT DOCUMENTS

| | | | | |
|---|---|---|---|---|
| EP | 0 498 621 A2 | 8/1992 | | |
| GB | 2060929 A | * | 5/1981 | ........... G02B 6/4427 |
| GB | 2 177 231 A | 1/1987 | | |

*Primary Examiner* — Krystal Robinson
(74) *Attorney, Agent, or Firm* — Seed IP Law Group LLP

(57) ABSTRACT

Disclosed is an opto-electric cable including one or more electrical conductors. Each conductor includes an electrically conductive core and an electrically insulating layer surrounding it. The cable also includes an optical unit embedded within one of the electrically conductive cores. The optical unit includes at least two optical fibers and a single buffer jointly surrounding all the optical fibers. Each optical fiber includes a core, a cladding and a coating. Since all the optical fibers of the optical unit are jointly surrounded—and protected—by a single buffer, an optical unit with a reduced size is obtained. This allows reducing the cross section of the electrical conductor in which the optical unit is arranged. In particular, electrical conductors with cross section lower than 10 mm² are obtained.

20 Claims, 1 Drawing Sheet

(56) References Cited

U.S. PATENT DOCUMENTS

| | | | | |
|---|---|---|---|---|
| 5,491,299 A | * | 2/1996 | Naylor | A61B 5/303 |
| | | | | 174/105 R |
| 5,621,841 A | * | 4/1997 | Field | G02B 6/4416 |
| | | | | 385/113 |
| 5,913,003 A | * | 6/1999 | Arroyo | G02B 6/4494 |
| | | | | 385/103 |
| 5,917,977 A | * | 6/1999 | Barrett | G02B 6/4434 |
| | | | | 385/103 |
| 5,917,978 A | * | 6/1999 | Rutterman | C03C 25/1065 |
| | | | | 385/109 |
| 2017/0358385 A1 | * | 12/2017 | Varkey | G02B 6/4416 |
| 2018/0108454 A1 | | 4/2018 | Shen et al. | |

* cited by examiner

OPTO-ELECTRIC CABLE

BACKGROUND

Technical Field

The present disclosure relates to the field of cables for building installation. In particular, the present disclosure relates to an opto-electric cable suitable for building installation.

Description of the Related Art

As is known, optical communications use light to carry information. Optical fibers are the most common type of channel for optical communications. An optical fiber is a dielectric (or non-electrically conductive) waveguide comprising a core surrounded by a cladding, both the core and the cladding being typically made of silica-based materials. Core and cladding have different refractive indexes so that total reflection occurs at their boundary, which confines light and allows its transmission along the fiber. An optical fiber typically also comprises a single-layer or double-layer coating (e.g., an acrylate coating) providing mechanical protection to core and cladding. Optical fibers for optical communications typically have a core with a diameter of about 8-9 microns, a cladding with an outer diameter of about 125 microns and a coating with an outer diameter of about 180-250 microns.

Optical fibers may be used for long-haul communications as well as for providing high-speed connections over short distances. For example, optical fibers may be used to deploy FTTX (Fiber to the X) network architecture for last mile telecommunications. In FTTX networks, the optical fibers typically run from the basement of a building through the various building floors, so as to provide a high-speed data connection to every user in the building. Optical fibers and optical cables comprising optical fibers are known, whose features (such as size, weight and bending properties) are particularly suitable for installation in buildings, typically in ducts within the building walls.

These ducts often house also other types of cables, such as electrical cables distributing LV (Low Voltage) power from the switchboard located in the building's basement to the end users. As is known, electrical cables comprise one or more electrical conductors. For example, a single-phase electrical cable connecting the switchboard in the building's basement to the circuit breaker panel provided at the user's premises typically comprises three electrical conductors, namely a phase conductor, a neutral conductor and an earth conductor. Each electrical conductor comprises an electrically conductive core (either solid or made of a bundle of metal wires, typically in copper or aluminum) surrounded by an insulating layer. A sheath jointly surrounds the three insulated electrical conductors and protects them against mechanical impacts and, depending on the cable's applications, also water and fire.

The increased demand for FTTX networks and the frequent need to install optical cables and electrical cables within the same ducts have brought the conception of opto-electric cables, which comprise both optical fibers and electrical conductors within the same sheath. Such cables allow providing both LV power and high-speed data connection with a single installation, thereby saving installation costs and space within the building's ducts.

The known cable Afumex® Duo by Prysmian Cables and Systems is an opto-electric cable comprising three copper electrical conductors and two optical fibers embedded amongst the conductive wires of the earth conductor. Each optical fiber (core, cladding and acrylate coating) is a standard G.657A single mode optical fiber with an outer diameter of 245 microns±5 microns and is individually protected by a respective buffer. Each buffer has an outer diameter of 900 microns±25 microns and is made of nylon (polyamide).

BRIEF SUMMARY

In the cable Afumex® Duo, each buffered optical fiber has an outer diameter of about 900 microns, hence the size of the optical assembly comprising the two buffered optical fibers arranged side by side is about 1.8 mm.

The Applicant has made some tests and found that, in order to properly accommodate in an electrical conductor such optical assembly without the risk of breaking it, the cross section of this electrical conductor, and, for symmetry, also of the other electrical conductors of the cable, shall not be smaller than 10 mm$^2$. A smaller cross section, e.g., 6 mm$^2$, entails issues in the manufacturing process, which may result in a breakage of the optical fibers.

The Applicant has then faced the problem of providing an opto-electric cable for building installation with one of the electrical conductors comprising at least two optical fibers embedded in its core, wherein each electrical conductor, including the one housing the optical fibers, may be manufactured with its conductive core having a cross section smaller than 10 mm$^2$.

According to embodiments of the present disclosure, the above problem is solved by an opto-electric cable comprising one or more electrical conductors, wherein each conductor comprises an electrically conductive core and an electrically insulating layer surrounding the electrically conductive core. The cable also comprises an optical unit embedded within at least one of the electrically conductive cores. The optical unit comprises at least two optical fibers (each optical fiber comprising a core, a cladding and a coating) and a single buffer jointly surrounding all the optical fibers.

Since all the optical fibers of the optical unit are jointly surrounded—and protected—by a single buffer, an optical unit with a reduced size is obtained. As it will be discussed in detail herein below, the Applicant has found that an optical unit comprising two optical fibers jointly surrounded by a single buffer can be provided, whose outer diameter is 900 microns, namely half the maximum size of an optical assembly comprising two singularly buffered optical fibers arranged side by side.

This allows reducing the cross section of the conductive core of the electrical conductor in which the optical unit is arranged. Electrical conductors with cross section of their conductive cores lower than 10 mm$^2$ can be obtained. This allows using the cable according to embodiments of the present disclosure in applications where, e.g., Class 5 conductive cores with cross section of 6 mm$^2$ each are required.

Therefore, according to a first aspect, the present disclosure provides for an opto-electric cable comprising:
  an electrical conductor comprising an electrically conductive core and an electrically insulating layer surrounding the electrically conductive core; and
  an optical unit embedded within the electrically conductive core,
wherein the optical unit comprises at least two optical fibers, each comprising a core, a cladding and a coating, the optical unit further comprising a buffer jointly surrounding the at least two optical fibers.

In an embodiment, in the opto-electric cable of the disclosure, the buffer is a tube tightly surrounding the optical fibers. Depending on the number of optical fibers surrounded, the buffer tube has an inner diameter in direct contact with at least some of the optical fibers contained therein, other optical fibers being in indirect contact with the inner diameter (they contact the inner diameter by contacting one or more optical fibers in direct contact with the inner diameter of the buffer tube). Hence, the optical fibers are compactly arranged within the buffer, with substantially no degree of freedom.

In an embodiment, the buffer is made of a material having a Shore D greater than 45.

In an embodiment, the buffer is made of a material selected from polybutylene terephthalate (PBT) or a low smoke zero halogen (LSOH) polymer composition.

In an embodiment, the electrically conductive core is made of a bundle of metal wires, and the optical unit is arranged amongst said metal wires.

In an embodiment, the metal wires are stranded about the buffer.

In an embodiment, the buffer is in direct contact with the metal wires.

In an embodiment, the optical unit comprises from 2 to 12 optical fibers, for example, from 2 to 8 or from 2 to 4 optical fibers.

In an embodiment, the optical fibers are arranged substantially parallel to a longitudinal axis of the optical unit.

In an embodiment, the optical unit may comprise a water-blocking compound filling voids between the optical fibers and the buffer. For example, the water-blocking compound could be a jelly compound.

In an embodiment, the optical unit has an outer diameter of 1 mm at most.

In an embodiment, the insulating layer of the conductor can be made of a LSOH polymer composition, of polyvinylchloride (PVC) or of cross-linked polyethylene (XLPE).

In an embodiment, the opto-electric cable of the present disclosure further comprises an outer sheath surrounding the electrical conductor. For example, the outer sheath is made of a LSOH polymer material or PVC.

In an embodiment, the opto-electric cable of the present disclosure comprises at least two electrical conductors, for example, three. The optical unit is arranged in at least one of said electrical conductors.

In an embodiment, a mica layer can be present between the electrically conductive core and the insulating layer. Otherwise, the electrically conductive core and the insulating layer are in direct contact with one another.

In an embodiment, a mica layer can be present in a radially inner position with respect to and in direct contact with the sheath surrounding the electrical conductor(s).

For the purpose of the present description and of the appended claims, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

BRIEF DESCRIPTION OF THE FIGURES

The present disclosure will become fully clear after reading the following detailed description, given by way of example and not of limitation, with reference to the attached drawings wherein.

DETAILED DESCRIPTION

Figure 1:
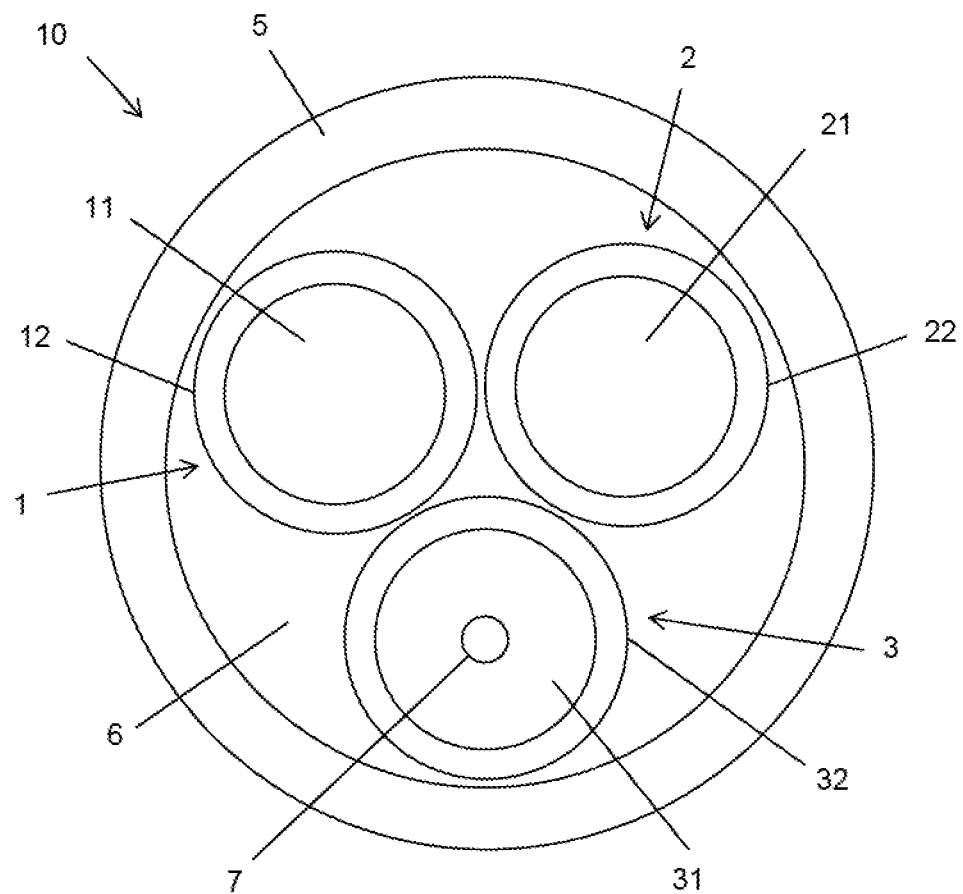
FIG. 1 shows an opto-electric cable according to an embodiment of the present disclosure.

FIG. 1 shows an opto-electric cable 10 according to an embodiment of the present disclosure.

The cable 10 comprises a number of insulated electrical conductors. By way of non-limiting example, the cable 10 depicted in FIG. 1 comprises three insulated electrical conductors 1, 2 and 3. For example, from the electrical point of view the cable 10 may be a single-phase electrical cable comprising a phase conductor 1, a neutral conductor 2 and an earth conductor 3.

Each insulated electrical conductor 1, 2, 3 comprises an electrically conductive core 11, 21, 31 and an insulating layer 12, 22, 32 surrounding the respective electrically conductive core 11, 21, 31.

Each electrically conductive core 11, 21, 31 may be either solid or a bundle of metal wires, at least one conductive core 11, 21, 31 being made of a bundle of metal wires. The metal wires can be stranded about the longitudinal axis of the conductor. For example, the electrically conductive core 31 (which, as will be discussed in detail hereinbelow, houses an optical unit) may be made of a bundle of metal wires, while the other electrically conductive cores 11 and 21 may be either solid or made of respective bundles of metal wires. The electrically conductive cores 11, 21, 31 may be made of copper, aluminum or a composite thereof.

Each electrically insulating layer 12, 22, 32 is made of an electrically insulating material. The electrically insulating material may be, for example, PVC (polyvinyl chloride), a flame retardant material such as a LSOH polymer composition, or XLPE (cross-linked polyethylene). The insulating material used for the insulating layers may be colored, in order to allow the field operator installing the cable 10 to easily distinguishing each insulated electrical conductor 1, 2, 3. For example, the insulating layer 12 of the phase conductor 1 may be brown, the insulating layer 22 of the neutral conductor 2 may be blue and the insulating layer 32 of the earth conductor 3 may be yellow and green.

The cable 10 also comprises a sheath 5 surrounding all the insulated electrical conductors 1, 2, 3. The sheath 5 can be the outermost layer of the cable 10. The sheath 5 can be made of an electrical insulating material. The electrically insulating material may be, for example, PVC (polyvinyl chloride) or a flame retardant material, such as a LSOH polymer or PE (polyethylene). The sheath 5 can have a thickness ranging, for example, from 1.4 mm to 1.8 mm.

Optionally, the cable 10 may also comprise a bedding 6 filling the free space (namely, the space not occupied by the insulated electrical conductors 1, 2, 3) within the sheath 5.

The bedding 6 may be made of rubber. When any bedding layer is missing, a thin layer of talcum powder, against adherence of insulation materials to outer sheath material, can be applied.

A tape of polymeric material can be provided to surround the insulated electrical conductors 1, 2, 3 within the sheath 5. In this case, the bedding 6 may be omitted.

In an embodiment, filler rods can be provided in the free space as defined above, in the place of the bedding 6.

The cable 10 also comprises an optical unit 7. The optical unit 7 can be embedded within the conductive core of anyone of the insulated electrical conductors 1, 2, 3. By way of non-limiting example, the optical unit 7 may be arranged amongst the metal wires of the conductive core 31 of the insulated earth conductor 3. According to other embodiments not depicted in the drawings, the optical unit 7 may be embedded in the conductive core of any one of the other insulated electrical conductors 1 (phase) or 2 (neutral).

The optical unit 7 comprises at least two optical fibers. By way of non-limiting example, the optical unit 7 shown in FIG. 2 comprises two optical fibers 70a, 70b. The optical unit 7 could comprise 2-12 optical fibers, without substantially increasing the cable overall dimensions (the increase being, for example, of no more than 0.1 mm in diameter).

Each optical fiber 70a, 70b comprises a core 71a, 71b surrounded by a cladding 72a, 72b. The core 71a, 71b and the cladding 72a, 72b are generally made of silica-based materials with different reflective indexes. Each optical fiber 70a, 70b also comprises a coating 73a, 73b providing mechanical protection to core and cladding. The coatings 73a, 73b may be single-layer or double-layer coatings. The coatings 73a, 73b can be made of an acrylate material.

The optical fibers 70a, 70b can be single-mode communication fibers. Their cores 71a, 71b can have a diameter of about 8-9 microns, their claddings 72a, 72b can have an outer diameter of about 125 microns and their coatings 73a, 73b can have an outer diameter comprised between 180 microns and 250 microns, for example, of 180, 200 or 250 microns. For example, the optical fibers 70a, 70b may be compliant to specifications ITU-T G.657 A2 (November 2009) and/or ITU-T G.657 B2/B3 (November 2009) defining the features of bend-insensitive single mode fibers for access networks and customer premises.

The optical fibers 70a, 70b can be arranged longitudinally, substantially parallel to the longitudinal axis of the optical unit 7.

The optical unit 7 also comprises a buffer 74. The buffer 74 jointly surrounds all the optical fibers of the optical unit 7, in the present case the optical fibers 70a, 70b. The buffer 74 can be a tubular buffer, the optical fibers 70a, 70b being arranged within it. The two optical fibers 70a, 70b are arranged side-by-side in close reciprocal contact and the inner diameter of the buffer 74 is substantially equal to the sum of the outer diameters of the fibers 70a, 70b (specifically, of their coatings 73a, 73b). Hence, the optical fibers 70a, 70b are compactly arranged within the buffer 74, with substantially no degree of freedom.

Optionally, the optical unit 7 may also comprise a water-blocking compound 75, which fills the voids between the optical fibers 70a, 70b and the inner surface of the buffer 74. For example, the water-blocking compound 75 may be a jelly compound.

In an embodiment, the buffer 74 is externally in direct contact with the material of the electrically conductive core 31, e.g., with the metal wires of the electrically conductive core 31. For example, the metal wires of the electrically conductive core 31 may be stranded about the buffer 74, so that the optical unit 7 is substantially at the center of the conductive core 31.

The buffer 74 can be made of a material hard enough to guarantee mechanical protection to the optical fibers 70a, 70b against mechanical stresses exerted by the metal wires of the conductive core 31 that surround the buffer 74, so as to preserve the fiber performance e.g., in terms of micro bending losses. The buffer 74 is made of a material having a Shore D greater than 45, for example, greater than 50, for example, up to 80.

The buffer 74 can be made of a LSOH polymer composition. Examples of a suitable LSOH polymer composition are ECCOH' compounds (marketed by PolyOne). Alternatively, the buffer 74 can be made of polybutylene terephthalate (PBT).

Use of a material with Shore D greater than 45 can guarantee suitable mechanical protection to optical fibers 70a, 70b even with a relatively thin buffer 74. The Applicant has estimated that a buffer thickness comprised between 200 microns and 500 microns can guarantee a suitable mechanical protection of the fibers 70a, 70b, while keeping the overall outer diameter of the optical unit 7 to a value allowing its embedding in an electrical conductor with conductive core whose cross section is smaller than 10 mm$^2$. For example, assuming that the two fibers 70a, 70b are buffered and the outer diameter of each fiber ranges from 200 microns to 250 microns as described above, the resulting outer diameter of the buffer 74 can be comprised between 600 microns and 1 mm.

Examples of dimensions of optical fiber units according to the present disclosure and containing two optical fibers are provided in Table I. The fiber diameter refers to a single optical fiber. The buffer size refers to a buffer tube made of an LSOH polymer composition.

TABLE I

| Fiber diameter | Buffer thickness [μm] | | | Buffer diameter [μm] | | |
|---|---|---|---|---|---|---|
| | No of fibers: | | | | | |
| [μm] | 2 | 3 | 4 | 2 | 3 | 4 |
| 180 | 220 | 205 | 185 | 800 | 800 | 800 |
| 200 | 200 | 185 | 210 | 800 | 800 | 900 |
| 250 | 200 | 180 | 200 | 900 | 900 | 1000 |

A LSOH polymer composition used for the buffer 74, as generally being made of thermoplastic material, typically exhibits poor adhesion to the acrylate material of the fiber coatings 73a, 73b. The inner wall of the buffer 74 may then be in direct contact with the fibers 70a, 70b, without the need of providing any lubricant which would require increasing the inner diameter of the buffer tube 74 and then of the whole optical unit 7.

Since all the optical fibers of the optical unit 7 are jointly surrounded—and protected—by a single buffer 74, the optical unit 7 has an external size smaller than the typical size of an optical assembly comprising singularly buffered optical fibers arranged side by side. This allows reducing the cross section of the conductive core 31 of the electrical conductor 3 in which the optical unit 7 is arranged, and hence—for preserving symmetry of the cable construction—also of the conductive cores of the other insulated electrical conductors 1, 2 of the cable. In particular, each insulated electrical conductor 1, 2, 3 may be manufactured with a cross section of its conductive core 11, 21, 31 lower than 10 mm$^2$, such as 6 mm$^2$. This allows use of the cable 10 in applications where e.g., Class 5 conductive cores with cross section of 6 mm$^2$ are required.

Figure 2:
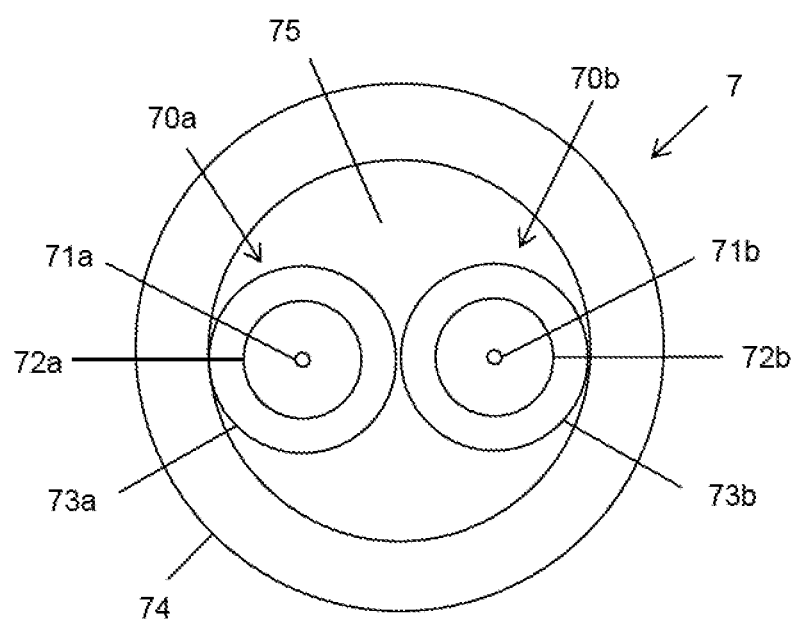
FIG. 2 shows in more detail the optical unit comprised in the cable of FIG. 1.

The Applicant has performed some tests on an opto-electric cable with the structure depicted in FIGS. 1 and 2. The two optical fibers were G.657.A2 250 microns Bend-Bright®-XS fibers, manufactured and sold by Prysmian Group. They were closely arranged in a buffer made of LSOH, in particular PolyOne ECCOH™ 6150 with Shore D equal to 53 and thickness of 200 microns. The optical unit including the two BendBright®-XS fibers and the LSOH buffer was embedded in the earth conductor of a single-phase electrical cable comprising a phase conductor, a neutral conductor and an earth conductor. Each electrical conductor consisted of a bundle of copper wires surrounded by an insulating layer made of PVC. The cross section of the conductive core of each electrical conductor had an area of 6 mm$^2$. The cable also comprised an outer sheath made of PVC. The thickness of the sheath was of 1.8 mm.

The tests carried out on the cable and their results are summarized in Table II set forth hereinbelow.

TABLE II

| Test name | Test Method | Result |
| --- | --- | --- |
| crush test | IEC 60794-1-21 E3A (2015 March) | pass |
| impact test | IEC 60794-1-21 E4 (2015 March) | pass |
| cable bend test | IEC 60794-1-21 E11A (2015 March) | pass |
| high voltage test | IEC 60502-1 (2005) | pass |
| electrical resistance of conductors | IEC 60228 (2004) | pass |

As far as the crush test is concerned, its typical purpose is to determine the ability of a cable comprising optical fibers to withstand crushing. The crush test was carried out according to IEC 60794-1-21 E3A, by applying loads starting from 1000 N up to 5000 N using a 100 mm crushing plate applied for 15 minutes. Each load was applied at three different longitudinal positions of the cable, which were reciprocally spaced by 500 mm. The optical fibers of the cable were connected to a light source and a power meter for measuring power variations and hence optical attenuation. The pass/fail criteria for the test were:

(i) increase of the optical attenuation of the fibers before and after application of the 1000 N load≤0.05 dB; and
  (ii) no structural damages to the cable and its components (sheath) after applications of all loads.

The attenuation of the optical fibers was measured before, during and after application of all the loads. It was substantially unchanged. Visual inspection of the cable after application of all the loads revealed no damages to the cable and its components. The crush test was then passed.

As far as the impact test is concerned, its typical purpose is to determine the ability of a cable comprising optical fibers to withstand impacts. The impact test was carried out according to IEC 60794-1-21 E4, at three different longitudinal positions of the cable, which were reciprocally spaced by 500 mm. Six different values of impact energy were applied, namely 5 Nm, 10 Nm, 15 Nm, 20 Nm, 25 Nm and 30 Nm, at ambient temperature (20° C.). The hammer radius was 300 mm. The optical fibers of the cable were connected to a light source and a power meter for measuring power variations and hence optical attenuation. The pass/fail criteria for the test were:

(i) increase of the optical attenuation of the fibers before and after the impacts ≤0.05 dB; and
  (ii) no structural damages to the cable and its components (sheath) after the impacts.

The attenuation of the optical fibers was measured before, during and after the impacts. It was substantially unchanged. Visual inspection of the cable after the impacts revealed no damages to the cable and its components. The impact test was then passed.

As far as the cable bend test is concerned, the typical purpose of this test is to determine the ability of a cable comprising optical fibers to withstand bending around a test mandrel. The cable bend test was carried out according to IEC 60794-1-21 E11A, using two different mandrels with diameters of 50 mm and 100 mm. The optical fibers of the cable were connected to a light source and a power meter for measuring power variations and hence optical attenuation. The test for each mandrel diameter was performed three times (3 test cycles). The pass/fail criterion for the test was:

(i) increase of the optical attenuation of the fibers before and after the bending ≤0.05 dB; and The attenuation of the optical fibers was measured before, during and after the bending. It was substantially unchanged. Visual inspection of the cable after the bending revealed no damages to the cable and its components. The cable bend test was then passed.

As far as the high voltage test is concerned, its typical purpose is to verify that the tested cable is compliant with the international standard mentioned above. The high voltage test was carried out according to IEC 60502-1 by connecting the cable to a 4 KV voltage source and a 6 KV Kilovoltmeter. A voltage of 3.5 KV AC was applied for 5 minutes. No breakdown of the insulation occurred.

As far as the test on electrical resistance of conductors, the typical purpose of such test is to verify that the tested cable is compliant with the international standard mentioned above. This test was carried out according to IEC 60228, by connecting the cable to a micro-ohmmeter to measure the electrical resistance of each electrical conductor of the cable. The pass/fail criterion for the test was:

(i) electrical resistance of each conductor ≤3.08 ohm/km.

The measurement resistances were: 3.058 ohm/Km for the phase conductor, 3.057 ohm/Km for the neutral conductor and 3.080 ohm/Km for the earth conductor. The test on electrical resistance of conductors was then passed.

The tested cable therefore showed good performance both from the optical point of view and from the electrical point of view.

The cable of the present disclosure can be manufactured according to the following.

Buffer material (e.g., LSOH polymer material) is extruded longitudinally around 2-4 longitudinally arranged optical fibers, in the form of a tube. After the extruder head, the so obtained optical unit is passed through a cooling trough filled with water, to cool it down and avoid buffer deformations during winding on take-up drum.

Copper wires are drawn to obtain the sought diameter of individual wires (0.3 mm, for example) and bunched up (e.g., 20×0.3 mm) in a parallel manner, e.g., parallelly. Bunches of wires (e.g., 4 bunches) are stranded to form the electrically conductive core having, in this example, a cross-section of 6 mm$^2$.

In one of the electrically conductive cores (for example, the earth conductor), the optical unit as manufactured above is placed approximately in the middle of wires bunches (4, in the present example), to ensure the smaller torsion stress is applied to optical fibers and consequently the fibers integrity.

Each electrically conductive core optionally containing the optical unit is then insulated by extruding an electrically insulating material (e.g., PVC) longitudinally around. The insulating material can comprise a standardized color for identification purpose. After the extruder head, the insulated conductor is passed through a cooling trough filled with water, to cool it down and avoid insulation deformations during winding on take-up drum.

The so obtained electrical conductors are stranded one another in SZ, S or Z sense.

One or more filler rods with substantially round cross-section may be provided stranded with the electrical conductors or in the middle of the strand of the electrical conductors, depending on the number of the conductors in the cable and/or of the application requirement.

Instead of filler rod(s), a bedding layer can be provided by extrusion around the insulated electrical conductors.

In the absence of a bedding, a tape may be helically wound around the insulated electrical conductors and, optionally, around the filler rod(s).

The strand of electrical conductors (and, optionally, of filler rod(s)) is then sheathed by extruding a sheathing material (e.g., PVC) longitudinally around.

If the cable design comprises neither bedding nor wound tape, the sheath is applied by pressure extrusion allowing the penetration of the sheath material in the spaces among insulated electrical conductors and, if any, filler rod(s). In this case there is an application of talcum powder between insulation and sheath, which avoids the bonding of sheath material to insulation material.

After the extruder head, the opto-electrical cable is passed through a cooling trough filled with water, to cool it down and avoid sheath deformations during winding on take-up drum.

Together with sheath application a cable sheath marking process can also be carried out by ink-jet, embossing, indenting or hot print foil. The marking method should match with the type of sheath material.

The various embodiments described above can be combined to provide further embodiments. Aspects of the embodiments can be modified to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An opto-electric cable comprising:
an electrical conductor including an electrically conductive core of a bundle of metal wires and an electrically insulating layer surrounding the electrically conductive core; and
an optical unit embedded within the electrically conductive core,
wherein the optical unit includes at least two optical fibers and a buffer jointly surrounding the at least two optical fibers, each optical fiber of the at least two optical fibers including a core, a cladding and a coating, and
wherein the optical unit is arranged amongst the bundle of metal wires, the buffer being in direct contact with one or more metal wires of the bundle of metal wires.

2. The opto-electric cable according to claim 1, wherein the buffer is a tube tightly surrounding the optical fiber.

3. The opto-electric cable according to claim 1, wherein the buffer is made of a material having a Shore Durometer Hardness value greater than 45.

4. The opto-electric cable according to claim 1, wherein the buffer is made of a material selected from one or more of polybutylene terephthalate or a low smoke zero halogen polymer composition.

5. The opto-electric cable according to claim 1, wherein the metal wires are stranded about the buffer.

6. The opto-electric cable according to claim 1, wherein the optical unit comprises from 2 to 12 optical fibers.

7. The opto-electric cable according to claim 6, wherein the optical unit comprises from 2 to 8 optical fibers.

8. The opto-electric cable according to claim 1, wherein the optical fibers are arranged parallel to a longitudinal axis of the optical unit.

9. The opto-electric cable according to claim 1, wherein the optical unit comprises a water-blocking compound between the optical fibers and the buffer.

10. The opto-electric cable according to claim 1, wherein the optical unit has an outer diameter of 1 mm at most.

11. The opto-electric cable according to claim 1, wherein the insulating layer is made of a low smoke zero halogen polymer composition of polyvinylchloride or of cross-linked polyethylene.

12. The opto-electric cable according to claim 1 further comprising an outer sheath surrounding the electrical conductor.

13. The opto-electric cable according to claim 1 comprising at least two electrical conductors, the optical unit being arranged in at least one of the at least two electrical conductors.

14. An opto-electric cable comprising:
an electrical conductor including an electrically conductive core of a bundle of metal wires and an electrically insulating layer surrounding the electrically conductive core; and
an optical unit embedded within the electrically conductive core,
wherein the optical unit includes at least two optical fibers and a buffer jointly surrounding the at least two optical fibers, each optical fiber of the at least two optical fibers including a core, a cladding and a coating, and
wherein the optical unit is arranged amongst the bundle of metal wires and metal wires of the bundle of metal wires are stranded about the buffer.

15. The opto-electric cable according to claim 14, wherein the buffer is in direct contact with one or more metal wires of the bundle of metal wires.

16. The opto-electric cable according to claim 14, wherein the buffer is a tube tightly surrounding the optical fiber.

17. The opto-electric cable according to claim 14, wherein the buffer is made of a material having a Shore Durometer Hardness value greater than 45.

18. The opto-electric cable according to claim 14, wherein the buffer is made of a material selected from one or more of polybutylene terephthalate or a low smoke zero halogen polymer composition.

19. An opto-electric cable comprising:
an electrical conductor including an electrically conductive core and an electrically insulating layer surrounding the electrically conductive core; and
an optical unit embedded within the electrically conductive core,
wherein the optical unit includes at least two optical fibers and a buffer jointly surrounding the at least two optical fibers, each optical fiber of the at least two optical fibers including a core, a cladding and a coating, and wherein the optical unit is substantially at a center of the electrically conductive core and in direct contact with the electrically conductive core.

20. The opto-electric cable according claim 19, wherein the electrically conductive core is made of a bundle of metal wires, and wherein the optical unit is arranged amongst metal wires of the bundle of metal wires.

* * * * *